United States Patent
Lin et al.

(10) Patent No.: US 11,934,674 B2
(45) Date of Patent: Mar. 19, 2024

(54) METHOD, ELECTRONIC DEVICE, AND COMPUTER PROGRAM PRODUCT FOR STORING AND ACCESSING DATA ACROSS MULTIPLE SERVERS UTILIZING METADATA OF A DISTRIBUTED HASH TABLE

(71) Applicant: EMC IP Holding Company LLC, Hopkinton, MA (US)

(72) Inventors: Zhenzhen Lin, Shanghai (CN); Si Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 17/072,363

(22) Filed: Oct. 16, 2020

(65) Prior Publication Data

US 2022/0100372 A1 Mar. 31, 2022

(30) Foreign Application Priority Data

Sep. 27, 2020 (CN) .......................... 202011034970.5

(51) Int. Cl.
*G06F 3/06* (2006.01)
*G06F 16/22* (2019.01)

(52) U.S. Cl.
CPC ............ *G06F 3/064* (2013.01); *G06F 3/0604* (2013.01); *G06F 3/067* (2013.01); *G06F 16/2255* (2019.01)

(58) Field of Classification Search
CPC ........ G06F 3/064; G06F 3/067; G06F 3/0604; G06F 16/2255
See application file for complete search history.

(56) References Cited

U.S. PATENT DOCUMENTS 5,737,344 A * 4/1998 Belser ................ G11B 20/1833
714/766
9,613,046 B1 4/2017 Xu et al.
(Continued)

FOREIGN PATENT DOCUMENTS

CN 1771495 A 5/2006
CN 106453244 A 2/2017

OTHER PUBLICATIONS

IPFS, "Merkle Distributed Acyclic Graphs (DAGs)" https://docs.ipfs.io/concepts/merkle-dag/, Accessed Oct. 16, 2020, 3 pages.
(Continued)

*Primary Examiner* — Mark A Giardino, Jr.
(74) *Attorney, Agent, or Firm* — Ryan, Mason & Lewis, LLP (57) ABSTRACT

Embodiments of the present disclosure relate to a method, an electronic device, and a computer program product for storing and accessing data. A method for storing data includes: dividing, in response to receiving a request for storing data from a client, the data into a plurality of data blocks; storing the plurality of data blocks in a plurality of servers respectively; generating metadata of the data to record corresponding addresses for storing the plurality of data blocks in the plurality of servers; and storing the generated metadata in a metadata repository. The embodiments of the present disclosure can effectively improve data transmission efficiency, data availability, and data security in a cloud storage system.

18 Claims, 6 Drawing Sheets

(56) References Cited

U.S. PATENT DOCUMENTS

| | | | | |
|---|---|---|---|---|
| 9,916,198 | B2* | 3/2018 | Baker | G06F 11/1076 |
| 2009/0006891 | A1* | 1/2009 | Bates | G06F 11/1076 |
| | | | | 714/E11.054 |
| 2010/0162003 | A1* | 6/2010 | Dodgson | H04L 9/0894 |
| | | | | 713/193 |
| 2015/0280996 | A1* | 10/2015 | Berube | H04L 41/12 |
| | | | | 709/224 |
| 2016/0080111 | A1 | 3/2016 | Maeda et al. | |
| 2017/0272209 | A1* | 9/2017 | Yanovsky | H04L 9/0863 |
| 2017/0286436 | A1* | 10/2017 | Neporada | H03M 13/353 |
| 2020/0117372 | A1* | 4/2020 | Corey | G06F 3/0619 |
| 2021/0286734 | A1* | 9/2021 | Beaverson | G06F 3/067 |
| 2022/0083392 | A1* | 3/2022 | Hofer | G06F 9/5072 |

OTHER PUBLICATIONS

Wikipedia, "Merkle Tree," https://en.wikipedia.org/wiki/Merkle_tree, Sep. 8, 2020, 5 pages.
Wikipedia, "Distributed Hash Table," https://en.wikipedia.org/wiki/Distributed_hash_table, Sep. 15, 2020, 10 pages.

* cited by examiner

METHOD, ELECTRONIC DEVICE, AND COMPUTER PROGRAM PRODUCT FOR STORING AND ACCESSING DATA ACROSS MULTIPLE SERVERS UTILIZING METADATA OF A DISTRIBUTED HASH TABLE

RELATED APPLICATION(S)

The present application claims priority to Chinese Patent Application No. 202011034970.5, filed Sep. 27, 2020, and entitled "Method, Electronic Device, and Computer Program Product for Storing and Accessing Data," which is incorporated by reference herein in its entirety.

FIELD

Embodiments of the present disclosure generally relate to the field of data storage, and more particularly, to a method, an electronic device, and a computer program product for storing and accessing data.

BACKGROUND

With the development of cloud storage technology, more and more data storage systems use hybrid clouds or a plurality of clouds to store data. Functions and interfaces provided by different cloud providers are often different. Challenges are posed for operations such as data storage, data access, and data migration between a plurality of clouds. Some solutions have designed an abstraction layer between a cloud storage server and a client to provide customers with unified data processing functions and interfaces. However, these solutions still have some obvious shortcomings, such as reduced data availability, insufficient data security, and low data transmission efficiency.

SUMMARY

The embodiments of the present disclosure provide a method, an electronic device, and a computer program product for storing and accessing data.

In a first aspect of the present disclosure, a method for storing data is provided. The method includes: dividing, in response to receiving a request for storing data from a client, the data into a plurality of data blocks; storing the plurality of data blocks in a plurality of servers respectively; generating metadata of the data to record corresponding addresses for storing the plurality of data blocks in the plurality of servers; and storing the generated metadata in a metadata repository.

In a second aspect of the present disclosure, a method for accessing data is provided. The method includes: acquiring, in response to receiving a request for accessing data from a client, metadata of the data from a metadata repository, the data being divided into a plurality of data blocks, and the metadata recording corresponding addresses for storing the plurality of data blocks in a plurality of servers; determining, based on the metadata, the corresponding addresses for storing the plurality of data blocks in the plurality of servers; acquiring the plurality of data blocks from the corresponding addresses in the plurality of servers; and combining, in response to the plurality of data blocks being acquired, the plurality of data blocks into the data for the client to access.

In a third aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: dividing, in response to receiving a request for storing data from a client, the data into a plurality of data blocks; storing the plurality of data blocks in a plurality of servers respectively; generating metadata of the data to record corresponding addresses for storing the plurality of data blocks in the plurality of servers; and storing the generated metadata in a metadata repository.

In a fourth aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: acquiring, in response to receiving a request for accessing data from a client, metadata of the data from a metadata repository, the data being divided into a plurality of data blocks, and the metadata recording corresponding addresses for storing the plurality of data blocks in a plurality of servers; determining, based on the metadata, the corresponding addresses for storing the plurality of data blocks in the plurality of servers; acquiring the plurality of data blocks from the corresponding addresses in the plurality of servers; and combining, in response to the plurality of data blocks being acquired, the plurality of data blocks into the data for the client to access.

In a fifth aspect of the present disclosure, a computer program product is provided. The computer program product is tangibly stored in a non-transitory computer storage medium and includes machine-executable instructions. The machine-executable instructions, when executed by a device, cause the device to perform any step of the method described according to the first aspect or the second aspect of the present disclosure.

In a sixth aspect of the present disclosure, a computer-readable storage medium is provided. A computer program is stored thereon. The computer program, when executed by a processor, implements any step of the method described according to the first aspect or the second aspect of the present disclosure.

This Summary is provided in order to introduce the selection of concepts in a simplified form, which will be further described in the Detailed Description below. The Summary is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent by the following detailed description of the example embodiments of the present disclosure when viewed in combination with the accompanying drawings. In the example embodiments of the present disclosure, the same reference numerals generally represent the same parts.

The same or corresponding reference numerals in the accompanying drawings represent the same or corresponding parts.

DETAILED DESCRIPTION

Illustrative embodiments of the present disclosure will be described in more detail below with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, that is, "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, with the development of cloud storage technology, more and more data storage systems use hybrid clouds or a plurality of clouds to store data. Functions and interfaces provided by different cloud providers are often different. Challenges are posed for operations such as data storage, data access, and data migration between a plurality of clouds. Some solutions have designed an abstraction layer between a cloud storage server and a client to provide customers with unified data processing functions and interfaces. However, these solutions still have some obvious shortcomings.

If data is only stored in one destination, the data is not secure. Considering that a data center or a cloud account is hacked, a user's data may be attacked by a malicious party. In addition, these storage platforms also have other insecure factors or risks, such as theft by former employees, which leads to insecure data and lack of privacy protection. In addition, in a distributed storage system, each node may independently acquire data from a cloud server, which may lead to potential performance limitations in terms of data throughput. If a large number of nodes query specific data at the same time, a cloud storage provider may exhaust its bandwidth and it may become a bottleneck in the entire data processing process. In some cases, for example, when the service of a certain cloud provider is interrupted, data stored in a cloud server provided by the cloud provider may not be available. That is, users may lose their data access rights when the cloud service fails. Some solutions also propose storing a plurality of copies of data at a plurality of cloud providers, so that when a data source is unavailable, users may acquire data from other data sources. Although these solutions can improve data availability and alleviate restrictions on access bandwidth, a data storage space consumed will greatly increase, and data synchronization and maintenance costs will also greatly increase.

A solution for storing and accessing data is provided in the embodiments of the present disclosure to solve the above problem and/or other potential problems. This solution improves the data transmission efficiency, data availability, and data security in a cloud storage system in a more economical way. This solution is widely applicable to users and/or application scenarios where it is expected to conveniently store a great amount of data in an economically efficient manner.

Figure 1:
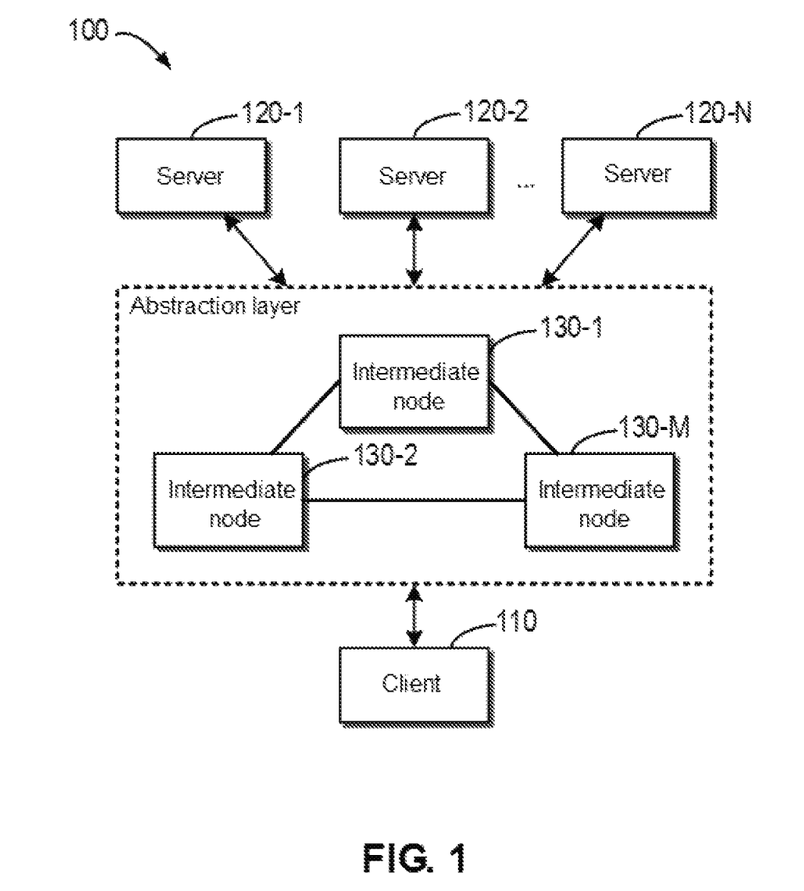
FIG. 1 shows a schematic diagram of an example environment in which embodiments of the present disclosure can be implemented.

Hereinafter, the embodiments of the present disclosure will be further described in detail with reference to the accompanying drawings. FIG. 1 shows a block diagram of example environment 100 in which the embodiments of the present disclosure can be implemented. It should be understood that the structure of environment 100 is described only for illustrative purposes, and does not imply any limitation to the scope of the present disclosure.

As shown in FIG. 1, environment 100 may include client 110, storage servers 120-1, 120-2, ..., 120-N (collectively or individually referred to as "server 120," where N>1), and an abstraction layer composed of one or more intermediate nodes 130-1, 130-2, ..., 130-M (collectively or individually referred to as "intermediate node 130," where M>1). For example, client 110, server 120, and intermediate node 130 may be implemented using any physical host, server, virtual machine, etc.

Client 110 may initiate a request for storing data to store the data at intermediate node 130 or server 120. Client 110 may also initiate a request for accessing data to access the data stored at intermediate node 130 or server 120. The plurality of servers 120 may be from the same or different cloud providers. Since functions and interfaces provided by different cloud providers are often different, the abstraction layer composed of intermediate nodes 130 may provide client 110 with unified data processing functions and interfaces.

Figure 2:
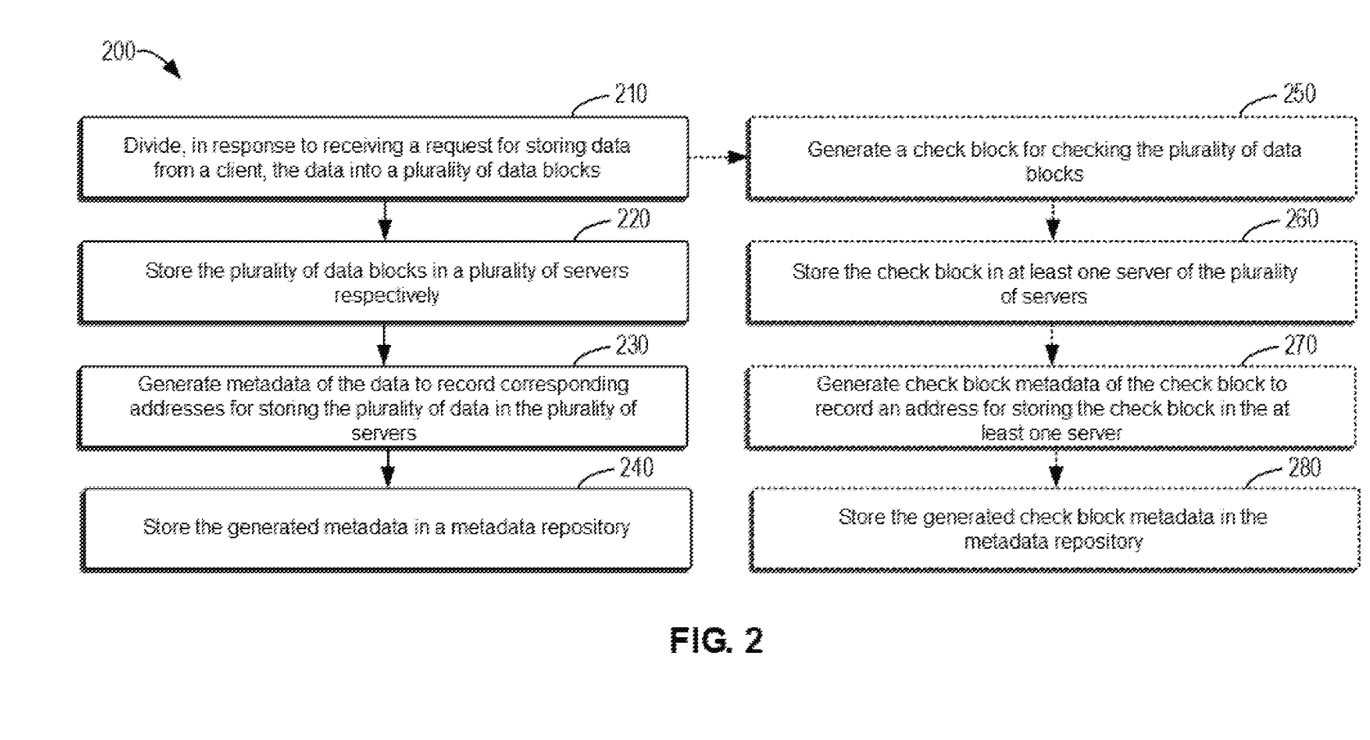
FIG. 2 shows a flowchart of an example method for storing data according to an embodiment of the present disclosure.

FIG. 2 shows a flowchart of example method 200 for storing data according to an embodiment of the present disclosure. For example, method 200 may be performed by intermediate node 130 as shown in FIG. 1. Method 200 is described in detail below with reference to FIG. 1. It should be understood that method 200 may also include additional actions not shown and/or omit actions shown, and the scope of the present disclosure is not limited in this regard.

At block 210, intermediate node 130 divides, in response to receiving a request for storing data from client 110, the data into a plurality of data blocks. The "data" mentioned here may be, for example, a file or any other data unit to be stored. In some embodiments, the division of data blocks may also be implemented at client 110.

Additionally or alternatively, in order to improve fault tolerance, at block 250, intermediate node 130 may generate a check block based on the plurality of data blocks. The check block may be generated using any known algorithm or any algorithm to be developed in the future to enable recovery of the content of a certain data block among the plurality of data blocks based on the contents of the check block and other data blocks when data of the data block is lost.

At block 220, intermediate node 130 stores the plurality of data blocks in a plurality of servers 120 respectively. In some embodiments, different data blocks may be stored in different servers 120. Alternatively, at least a part of the data blocks in the plurality of data blocks may also be stored in the same server 120.

Additionally or alternatively, in a case where a check block of a plurality of data blocks is generated, at block 260, intermediate node 130 stores the check block in at least one server 120 among the plurality of servers 120. A storage location of the check block may be determined by different factors. In some embodiments, for example, to achieve the maximum throughput, a server for storing a check block may be different from a server for storing a plurality of data blocks that generate the check block. In some embodiments, since the check block is rarely used under normal circumstances, the check block may be stored in a lower-end server. In some embodiments, the writing of the plurality of data blocks and the check block may be performed in parallel to improve the efficiency of data writing.

At block 230, intermediate node 130 generates metadata of the data to record corresponding addresses for storing the plurality of data blocks in the plurality of servers 120. Then, at block 240, intermediate node 130 stores the generated metadata in a metadata repository. Additionally or alternatively, in a case where a check block of a plurality of data blocks is generated, at block 270, intermediate node 130 may generate check block metadata of the check block to record an address for storing the check block in at least one server 120. Then, at block 280, intermediate node 130 stores the generated check block metadata in the metadata repository. It should be understood that in other embodiments, the generation and writing of metadata may also be performed before the writing of a data block and/or a check block. The embodiments of the present disclosure are not limited in this respect.

In some embodiments, based on a plurality of data blocks into which data is divided, a Merkle tree corresponding to the data may be generated, such as a Merkle directed acyclic graph (Merkle DAG). In a data access process, the Merkle tree may be used to verify the integrity of the plurality of acquired data blocks.

Figure 3:
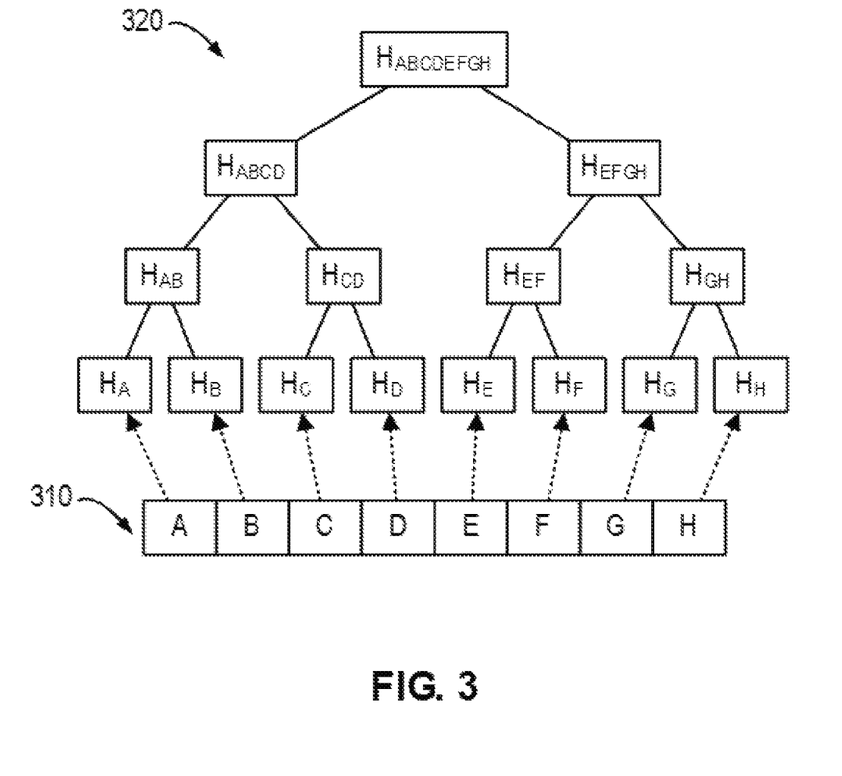
FIG. 3 shows a schematic diagram of dividing data into a plurality of data blocks and managing the plurality of data blocks using a Merkle tree according to an embodiment of the present disclosure.

FIG. 3 shows a schematic diagram of dividing data into a plurality of data blocks and managing the plurality of data blocks using a Merkle tree according to an embodiment of the present disclosure. FIG. 3 shows data 310 and its corresponding Merkle tree 320. Data 310 is, for example, a certain file, which may be divided into a plurality of data blocks A-H. A predetermined hash function may be used to generate hash values HA-HH of the plurality of data blocks. As shown in FIG. 3, each node in Merkle tree 320 may have a corresponding identifier. The hash values HA-HH may be used as identifiers of leaf nodes of Merkle tree 320 respectively. An identifier of a parent node is determined by a hash value of a child node. For example, the identifier of the parent node may be a hash value of a string obtained by concatenating hash values of two child nodes. The identifier of each node in Merkle tree 320 may be uniquely linked to the content of its payload and all child nodes thereof. For example, each non-leaf node in Merkle tree 320 may be implemented as a data structure containing two fields: a data field ("data") for recording a payload of the node and a link field ("Links") for recording information such as a hash value, a name, and a size of each of its child nodes. The data field in a root node may, for example, record a file name corresponding to Merkle tree 320. In this way, during data access, the hash values of the plurality of data blocks into which the data is divided may be determined by searching the corresponding Merkle tree based on a file name of data to be accessed. In some embodiments, in a case where a check block for checking a data block is configured, the root node of Merkle tree 320 may also include configuration information related to the check block to indicate the number of data blocks for generating the check block. The configuration information can save the storage overhead of non-leaf nodes for recording the check block, while a user can flexibly configure the number of data blocks for generating the check block.

The metadata of the plurality of data blocks and the check block metadata of the check block thereof may be stored in the metadata repository. In some embodiments, the metadata repository may be implemented using a distributed hash table (DHT) associated with the plurality of intermediate nodes 130.

Figure 4:
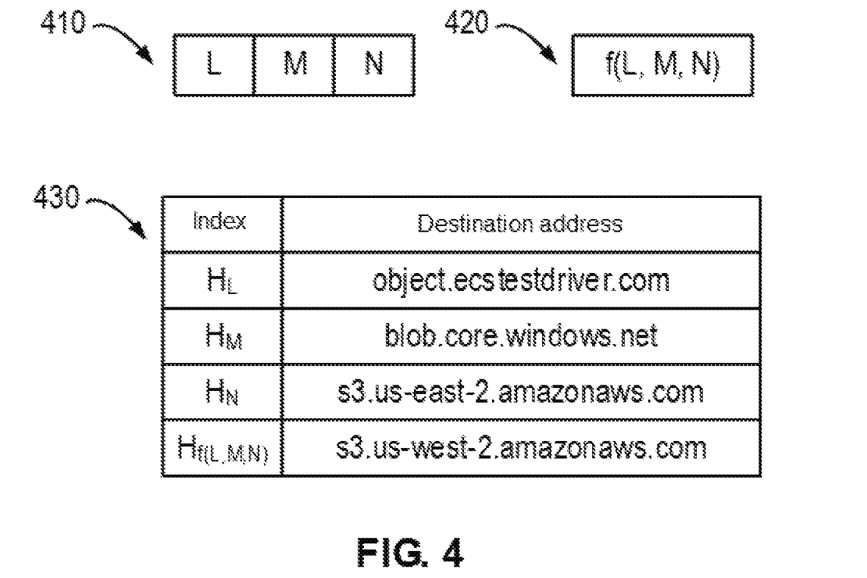
FIG. 4 shows a schematic diagram of an example distributed hash table for storing metadata of a plurality of data blocks and check block metadata of a check block thereof according to an embodiment of the present disclosure.

FIG. 4 shows a schematic diagram of an example DHT for storing metadata of a plurality of data blocks and check block metadata of a check block thereof according to an embodiment of the present disclosure. FIG. 4 shows data 410, which is divided into three data blocks L, M, and N. It is assumed here that the configuration information set by the user indicates that one check block is generated by every three data blocks. FIG. 4 shows check block 420, which is represented as f(L, M, N) based on data blocks L, M, and N, where f represents a function for generating the check block. FIG. 4 also shows DHT 430, which includes a plurality of entries. Each entry is a key-value pair of <index, destination address>. The index of an entry corresponding to a data block is represented by a hash value of the data block, and the destination address records a location where the data block is stored in the plurality of servers 120, for example, a uniform resource locator (URL). The index of an entry corresponding to a check block is represented by a hash value of the check block, and the destination address records a location where the check block is stored, for example, a URL. DHT 430 may be distributed in the plurality of intermediate nodes 130 as shown in FIG. 1. For example, each intermediate node 130 may store only a part of DHT 430. In addition, DHT 430 may also be persistently stored in certain server 120 or other data centers to prevent the entries stored at certain intermediate node 130 from being lost. It should be understood that writing and searching for DHT may be implemented based on any known algorithm or any algorithm to be developed in the future, and the scope of the present disclosure is not limited in this regard.

It should be understood that, in some cases, the check block may not be generated and used. That is, in this case, blocks 250-280 shown in FIG. 2 may not be executed.

In addition, in some embodiments, when a stored data block needs to be updated, updated data may be written in the form of a newly generated data block instead of modifying the old data block. In this way, a large number of write operations caused by updating the check block associated with the old data block can be avoided. After the new data block and the check block associated therewith are written, the old data block and the old check block associated therewith may be set to be invalid and thus not accessed.

Figure 5:
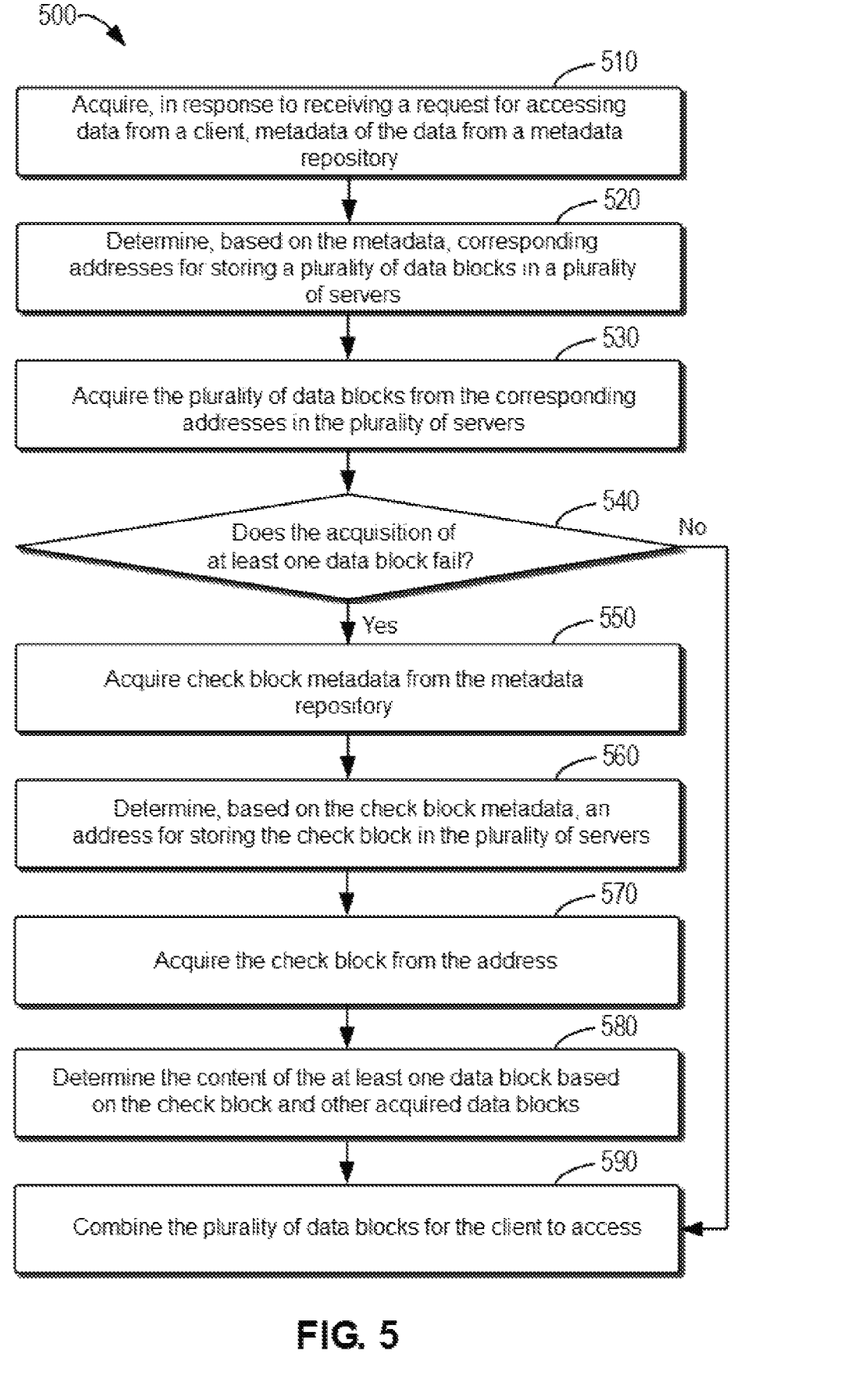
FIG. 5 shows a flowchart of an example method for accessing data according to an embodiment of the present disclosure.

FIG. 5 shows a flowchart of example method 500 for accessing data according to an embodiment of the present disclosure. For example, method 500 may be performed by intermediate node 130 as shown in FIG. 1. Method 500 is described in detail below with reference to FIG. 1. It should be understood that method 500 may also include additional actions not shown and/or omit actions shown, and the scope of the present disclosure is not limited in this regard.

As shown in FIG. 5, at block 510, intermediate node 130 acquires, in response to receiving a request for accessing data from a client, metadata of the data from a metadata repository (for example, a DHT associated with intermediate node 130). In some embodiments, the data is divided into a plurality of data blocks and the metadata records corresponding addresses for storing the plurality of data blocks in a plurality of servers 120.

At block 520, intermediate node 130 determines, based on the metadata, the corresponding addresses for storing the plurality of data blocks in the plurality of servers 120. Then, at block 530, intermediate node 130 acquires the plurality of data blocks from the corresponding addresses in the plurality of servers 120.

At block 540, intermediate node 130 determines whether there is an unsuccessfully acquired data block. For example, the data block stored in failed server 120 may not be accessible. For another example, intermediate node 130 may further verify the integrity of the plurality of acquired data blocks using a Merkle tree to determine whether each data block is damaged. The verification of data integrity may be implemented using any known algorithm or any algorithm to be developed in the future, and the scope of the present disclosure is not limited in this regard.

If all data blocks are successfully acquired, method 500 proceeds to block 590, and intermediate node 130 combines the plurality of data blocks to be provided to client 110 for access. If there is an unsuccessfully acquired data block, at block 550, intermediate node 130 acquires check block metadata of a check block from the metadata repository (for example, the DHT associated with intermediate node 130). The check block metadata records addresses for storing the check block in the plurality of servers 120.

At block 560, intermediate node 130 determines, based on the check block metadata, addresses for storing the check block in the plurality of servers 120. Then, at block 570, intermediate node 130 acquires the check block from the addresses.

At block 580, intermediate node 130 determines the content of the unsuccessfully acquired data block based on the check block and other data blocks that have been acquired among the plurality of data blocks. Then, at block 590, intermediate node 130 combines the plurality of data blocks to be provided to client 110 for access.

It should be understood that, in a specific implementation, some blocks shown as being executed serially in method 500 may be executed in parallel to improve execution efficiency. For example, in FIG. 5, the reading of a data block and the reading of a check block are shown as being executed serially. However, in a specific implementation, a reading mechanism of the check block may be determined based on various factors (for example, delay of a cloud provider, a failure rate of a data source, historical failure information, balance between data query delay and data transmission overhead, etc.) For example, in some embodiments, the reading of a check block and the reading of a data block may be executed in parallel to improve execution efficiency.

It can be seen from the above description that the embodiments of the present disclosure can effectively solve various problems existing in the prior art. For example, by dividing data into a plurality of blocks and uploading the blocks to cloud servers from different cloud providers, each cloud server cannot obtain a complete view of the data, thereby preventing data leakage caused by the cloud providers. In the process of data storage and access, since a plurality of data blocks may be processed and transmitted in parallel between different data sources, the efficiency of data storage and access is effectively improved. The introduction of a check block can effectively improve data availability. When a certain data block is not successfully acquired, a check block may be used to restore the content of the unsuccessfully acquired data block so that correct data is returned to the client. In addition, the embodiments of the present disclosure use check blocks instead of data copies to restore failure conditions, thereby effectively saving a cloud storage space and improving the data availability and the efficiency of data storage and access. That is, the embodiments of the present disclosure can improve data transmission efficiency, data availability, and data security in a cloud storage system in a more economical manner, and are thus widely applicable to users and/or application scenarios where it is expected to conveniently store a great amount of data in an economically efficient manner (for example, the field of the Internet of Things).

Figure 6:
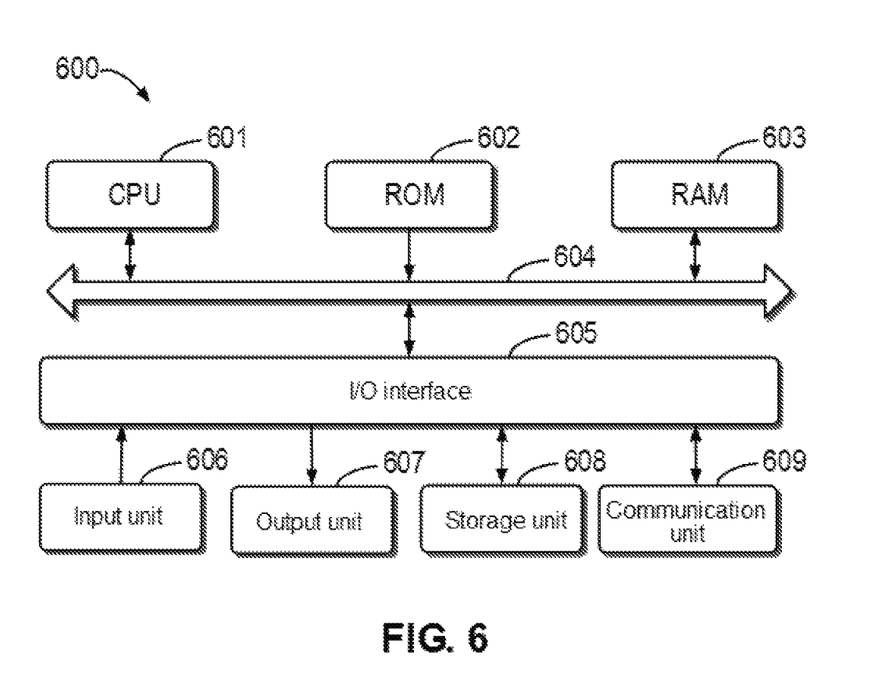
FIG. 6 shows a schematic block diagram of an example device that may be configured to implement an embodiment of content of the present disclosure.

FIG. 6 shows a schematic block diagram of example device 600 that may be configured to implement an embodiment of the content of the present disclosure. For example, client 110, server 120, and/or intermediate node 130 as shown in FIG. 1 may be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 into random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, methods 200 and/or 500, may be performed by CPU 601. For example, in some embodiments, methods 200 and/or 500 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of methods 200 and/or 500 described above may be performed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list)

of the computer-readable storage medium include: a portable computer disk, a hard disk drive, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field-programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to multiple embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the various embodiments disclosed herein.

What is claimed is:
1. A method, comprising:
dividing, in response to receiving a request for storing data from a client, the data into a plurality of data blocks;

storing the plurality of data blocks in a plurality of servers, respectively, wherein the plurality of servers are from respective ones of a plurality of cloud providers;

generating metadata of the data to record corresponding addresses for storing the plurality of data blocks in the plurality of servers; and storing the generated metadata in a metadata repository;

wherein the metadata repository is implemented at least in part using a distributed hash table for storing the metadata of the plurality of data blocks and check block metadata of at least one check block, the distributed hash table comprising a first entry corresponding to a hash value of a first data block and an address of a first server from a first one of the plurality of cloud providers for storing the first data block, a second entry corresponding to a hash value of a second data block and an address of a second server from a second one of the plurality of cloud providers, different than the first one of the plurality of cloud providers, for storing the second data block, and a third entry corresponding to a hash value of the at least one check block and an address of a third server from a third one of the plurality of cloud providers, different than the first one of the plurality of cloud providers and the second one of the plurality of cloud providers, for storing the at least one check block.

2. The method according to claim 1, further comprising:
generating the at least one check block for checking the plurality of data blocks;
storing the at least one check block in at least one server of the plurality of servers;
generating the check block metadata of the at least one check block to record at least one address for storing the at least one check block in the at least one server; and
storing the generated check block metadata in the metadata repository.

3. A computer program product tangibly stored in a non-transitory computer-readable storage medium and comprising machine-executable instructions that, when executed by a device, cause the device to perform the method of claim 1.

4. The computer program product according to claim 3, wherein the machine-executable instructions, when executed by a device, further cause the device to:
generate the at least one check block for checking the plurality of data blocks;
store the at least one check block in at least one server of the plurality of servers;
generate the check block metadata of the at least one check block to record at least one address for storing the at least one check block in the at least one server; and
store the generated check block metadata in the metadata repository.

5. The method according to claim 1, wherein the at least one check block is associated with configuration information that indicates a number of data blocks utilized in generating the at least one check block, the configuration information being part of the check block metadata stored in the metadata repository and being separate from the at least one check block.

6. A method, comprising:
acquiring, in response to receiving a request for accessing data from a client, metadata of the data from a metadata repository, the data being divided into a plurality of data blocks, and the metadata recording corresponding addresses for storing the plurality of data blocks in a plurality of servers, wherein the plurality of servers are from respective ones of a plurality of cloud providers;
determining, based on the metadata, the corresponding addresses for storing the plurality of data blocks in the plurality of servers;
acquiring the plurality of data blocks from the corresponding addresses in the plurality of servers; and
combining, in response to the plurality of data blocks being acquired, the plurality of data blocks into the data for the client to access;
wherein the metadata repository is implemented at least in part using a distributed hash table for storing the metadata of the plurality of data blocks and check block metadata of at least one check block, the distributed hash table comprising a first entry corresponding to a hash value of a first data block and an address of a first server from a first one of the plurality of cloud providers for storing the first data block, a second entry corresponding to a hash value of a second data block and an address of a second server from a second one of the plurality of cloud providers, different than the first one of the plurality of cloud providers, for storing the second data block, and a third entry corresponding to a hash value of the at least one check block and an address of a third server from a third one of the plurality of cloud providers, different than the first one of the plurality of cloud providers and the second one of the plurality of cloud providers, for storing the at least one check block.

7. The method according to claim 6, further comprising:
determining, in response to a failure to acquire at least one data block of the plurality of data blocks, content of the at least one data block based on the at least one check block for checking the plurality of data blocks and other data blocks that have been acquired in the plurality of data blocks; and
combining the plurality of data blocks into the data for the client to access.

8. The method according to claim 7, further comprising:
acquiring the check block metadata of the at least one check block from the metadata repository, the check block metadata recording at least one address for storing the at least one check block in the plurality of servers;
determining, based on the check block metadata, the at least one address for storing the at least one check block in the plurality of servers; and
acquiring the at least one check block from the at least one address.

9. An electronic device, comprising:
at least one processing unit; and
at least one memory which is coupled to the at least one processing unit and stores instructions for execution by the at least one processing unit, wherein the instructions, when executed by the at least one processing unit, cause the electronic device to perform actions comprising the method of claim 6.

10. The electronic device according to claim 9, wherein the actions further comprise:
determining, in response to a failure to acquire at least one data block of the plurality of data blocks, content of the at least one data block using the at least one check block for checking the plurality of data blocks and other data blocks that have been acquired in the plurality of data blocks; and combining the plurality of data blocks into the data for the client to access.

11. The electronic device according to claim 10, wherein the actions further comprise:
acquiring the check block metadata of the at least one check block from the metadata repository, the check block metadata recording at least one address for storing the at least one check block in the plurality of servers;
determining, based on the check block metadata, the at least one address for storing the at least one check block in the plurality of servers; and
acquiring the at least one check block from the at least one address.

12. A computer program product tangibly stored in a non-transitory computer-readable storage medium and comprising machine-executable instructions that, when executed by a device, cause the device to perform the method of claim 5.

13. The computer program product according to claim 6, wherein the machine-executable instructions, when executed by a device, further cause the device to:
determine, in response to a failure to acquire at least one data block of the plurality of data blocks, content of the at least one data block using the at least one check block for checking the plurality of data blocks and other data blocks that have been acquired in the plurality of data blocks; and
combine the plurality of data blocks into the data for the client to access.

14. The computer program product according to claim 13, wherein the machine-executable instructions, when executed by a device, further cause the device to:
acquire the check block metadata of the at least one check block from the metadata repository, the check block metadata recording at least one address for storing the at least one check block in the plurality of servers;
determine, based on the check block metadata, the at least one address for storing the at least one check block in the plurality of servers; and
acquire the at least one check block from the at least one address.

15. The method according to claim 6, wherein the at least one check block is associated with configuration information that indicates a number of data blocks utilized in generating the at least one check block, the configuration information being part of the check block metadata stored in the metadata repository and being separate from the at least one check block.

16. An electronic device, comprising:
at least one processing unit; and
at least one memory which is coupled to the at least one processing unit and stores instructions for execution by the at least one processing unit, wherein the instructions, when executed by the at least one processing unit, cause the electronic device to perform actions comprising:
dividing, in response to receiving a request for storing data from a client, the data into a plurality of data blocks;
storing the plurality of data blocks in a plurality of servers, respectively, wherein the plurality of servers are from respective ones of a plurality of cloud providers;
generating metadata of the data to record corresponding addresses for storing the plurality of data blocks in the plurality of servers; and
storing the generated metadata in a metadata repository;
wherein the metadata repository is implemented at least in part using a distributed hash table for storing the metadata of the plurality of data blocks and check block metadata of at least one check block, the distributed hash table comprising a first entry corresponding to a hash value of a first data block and an address of a first server from a first one of the plurality of cloud providers for storing the first data block, a second entry corresponding to a hash value of a second data block and an address of a second server from a second one of the plurality of cloud providers, different than the first one of the plurality of cloud providers, for storing the second data block, and a third entry corresponding to a hash value of the at least one check block and an address of a third server from a third one of the plurality of cloud providers, different than the first one of the plurality of cloud providers and the second one of the plurality of cloud providers, for storing the at least one check block.

17. The electronic device according to claim 16, wherein the actions further comprise:
generating the at least one check block for checking the plurality of data blocks;
storing the at least one check block in at least one server of the plurality of servers;
generating the check block metadata of the at least one check block to record at least one address for storing the at least one check block in the at least one server; and
storing the generated check block metadata in the metadata repository.

18. The electronic device according to claim 16, wherein the at least one check block is associated with configuration information that indicates a number of data blocks utilized in generating the at least one check block, the configuration information being part of the check block metadata stored in the metadata repository and being separate from the at least one check block.

* * * * *

UNITED STATES PATENT AND TRADEMARK OFFICE
CERTIFICATE OF CORRECTION

| | |
|---|---|
| PATENT NO. | : 11,934,674 B2 |
| APPLICATION NO. | : 17/072363 |
| DATED | : March 19, 2024 |
| INVENTOR(S) | : Zhenzhen Lin et al. |

It is certified that error appears in the above-identified patent and that said Letters Patent is hereby corrected as shown below:

In the Claims

Claim 12, Lines 18 and 19, please delete "the method of claim 5." and insert therefor --the method of claim 6.--

Claim 13, Line 20, please delete "The computer program product according to claim 6," and insert therefor --The computer program product according to claim 12,--

Signed and Sealed this
Thirtieth Day of April, 2024

Katherine Kelly Vidal
*Director of the United States Patent and Trademark Office*